United States Patent
Shiga et al.

(10) Patent No.: US 8,530,603 B2
(45) Date of Patent: Sep. 10, 2013

(54) GOLF BALL

(75) Inventors: Kazuyoshi Shiga, Kobe (JP); Tetsuro Abe, Kobe (JP); Takashi Sasaki, Kobe (JP)

(73) Assignee: SRI Sports Limited, Kobe (JP)

( * ) Notice: Subject to any disclaimer, the term of this patent is extended or adjusted under 35 U.S.C. 154(b) by 515 days.

(21) Appl. No.: 12/797,054

(22) Filed: Jun. 9, 2010

(65) Prior Publication Data

US 2010/0331113 A1 Dec. 30, 2010

(30) Foreign Application Priority Data

Jun. 30, 2009 (JP) .................................. 2009-154725

(51) Int. Cl.
 *A63B 37/00* (2006.01)
 *A63B 37/12* (2006.01)

(52) U.S. Cl.
 USPC ................. 528/75; 528/61; 528/65; 473/373; 473/374; 473/378

(58) Field of Classification Search
 None
 See application file for complete search history.

(56) References Cited

U.S. PATENT DOCUMENTS

| | | | | |
|---|---|---|---|---|
| 6,485,665 | B1 * | 11/2002 | Hermanutz et al. | 264/470 |
| 6,747,100 | B2 | 6/2004 | Ichikawa et al. | |
| 7,151,148 | B2 * | 12/2006 | Lutz et al. | 526/301 |
| 7,157,545 | B2 * | 1/2007 | Wu et al. | 528/196 |
| 7,601,290 | B2 | 10/2009 | Nagasawa et al. | |
| 8,193,296 | B2 * | 6/2012 | Ishii et al. | 528/75 |
| 2002/0193459 | A1 | 12/2002 | Haseyama et al. | |
| 2003/0064831 | A1 | 4/2003 | Ichikawa et al. | |
| 2006/0249880 | A1 | 11/2006 | Nagasawa et al. | |
| 2007/0072701 | A1 | 3/2007 | Nagasawa | |
| 2009/0023515 | A1 | 1/2009 | Tarao | |
| 2009/0286939 | A1 | 11/2009 | Nagasawa et al. | |
| 2011/0046306 | A1 | 2/2011 | Serhatkulu | |

FOREIGN PATENT DOCUMENTS

| | | |
|---|---|---|
| JP | 2002-201301 A | 7/2002 |
| JP | 2002-336378 A | 11/2002 |
| JP | 2003-12852 A | 1/2003 |
| JP | 2006-312043 A | 11/2006 |
| JP | 2007-90065 A | 4/2007 |
| JP | 2007-238958 A | 9/2007 |
| JP | 2009-022465 A | 2/2009 |
| JP | 2011-51890 A | 6/2011 |
| WO | WO-2009/132947 | * 11/2009 |

OTHER PUBLICATIONS

Hsu "Enhanced Biostability by Using Butenediol as Chain Extenders in the Synthesis of Poly(ether)urethanes" ,Polymer Degradation and Stability 65 (1999) pp. 341-345.*
LookChem entry for CAS # 2160-94-3 (no date).*
Translation of Japanese Office Action dated Jun. 12, 2012 for corresponding Application No. 2009-154725.
English translation of Japanese Notice of Reasons for Rejection for Application No. 2009-154725 dated Jul. 5, 2011.

* cited by examiner

*Primary Examiner* — David Buttner
(74) *Attorney, Agent, or Firm* — Birch, Stewart, Kolasch & Birch, LLP

(57) ABSTRACT

An object of the present invention is to provide a golf ball that has excellent abrasion resistance and spin performance without sacrificing the processability of the cover, in a golf ball having a cover for which a crosslinkable thermoplastic polyurethane is used as a resin component. The present invention provides a golf ball comprising: a core; and a cover covering the core, wherein the cover is formed from a cover composition containing a thermoplastic polyurethane that has, as a constituting component, a chain extender having an unsaturated carbon-carbon bond.

14 Claims, No Drawings

GOLF BALL

FIELD OF THE INVENTION

The present invention relates to a technique for improving the cover of a golf ball, in particular, to a technique for improving a urethane cover.

DESCRIPTION OF THE RELATED ART

As a resin component constituting a cover of a golf ball, an ionomer resin or polyurethane is used. Covers containing an ionomer resin are widely used for their excellent repulsion, durability and processability. However, the problems have been pointed out that the shot feeling is poor because of the high rigidity and hardness and that the controllability is also poor because of the insufficient spin performance. On the other hand, if polyurethane is used as the resin component, it is known that the shot feeling and spin performance are improved compared with an ionomer resin.

It has been studied that, in a golf ball having a urethane cover, the abrasion resistance of the cover is improved by crosslinking a polyurethane used as a resin component. For example, Japanese Patent Publication No. 2002-336378 A discloses a golf ball in which a core is covered with a cover that is formed from (C) a composition that contains, as main components, the following components (A) and (B):

(A) a thermoplastic polyurethane material; and
(B) an isocyanate mixture in which (b-1) an isocyanate compound having two or more isocyanate groups as a functional group in one molecule is dispersed in (b-2) a thermoplastic resin that essentially does not react with an isocyanate.

Japanese Patent Publication No. 2006-312043 A discloses that, after the cover of a golf ball is formed by using a thermoplastic polyurethane, annealing is performed under a certain relative humidity condition to generate allophanate and biuret crosslinked bonds. Japanese Patent Publication No. 2009-22465 A discloses a golf ball having a cover that is formed from a cover composition that contains a thermoplastic polyurethane containing a polyol having an unsaturated carbon-carbon bond as a component thereof and a crosslinking agent.

When cover materials such as a crosslinkable thermoplastic polyurethane and titanium oxide are blended and extruded for forming a cover, it is necessary to pay full attention to the extruding conditions. In other words, when the extruding temperature is excessively low, the viscosity of the cover composition is too high to be extruded. On the other hand, when the extruding temperature is excessively high, a decomposition reaction of urethane bonds occurs. As a result, the molecular weight of the thermoplastic polyurethane decreases, and desired cover characteristics cannot be exhibited. In addition, even when the extrusion is performed at an optimal temperature, if the extruding time is excessively short, the cover materials cannot be sufficiently blended, while if the extruding time is excessively long, three-dimensional crosslinking is formed, resulting in that the viscosity increases and the extrusion cannot be performed.

The present invention has been made in view of the above circumstances, and an object of the present invention is to provide a golf ball that has excellent abrasion resistance and spin performance without sacrificing the processability of the cover, in a golf ball having a cover for which a thermoplastic polyurethane capable of undergoing a crosslinking reaction (hereinafter, may be referred to as "crosslinkable thermoplastic polyurethane") is used as a resin component.

SUMMARY OF THE INVENTION

The present invention, which has solved the above problems, provides a golf ball comprising: a core; and a cover covering the core, wherein the cover is formed from a cover composition containing a thermoplastic polyurethane that has, as a constituting component, a chain extender having an unsaturated carbon-carbon bond. In general, a thermoplastic polyurethane has: a soft segment consisting of a high-molecular weight polyol component; and a hard segment consisting of a polyisocyanate component and a chain extender component. In the hard segment, molecular chains having repeating units of the polyisocyanate component and the chain extender component, are adjacent to each other through hydrogen bonds between urethane bonds. When unsaturated carbon-carbon double bonds are introduced into parts of the molecular chains that constitute the hard segment, a crosslinking reaction tends to occur between the molecular chains, since the molecular chains are adjacent to each other. Thus, a gist of the present invention is to use, as a cover material, a thermoplastic polyurethane that contains, as a chain extender component for constituting the hard segment, a component having an unsaturated carbon-carbon bond.

If the cover composition containing the thermoplastic polyurethane that has, as a constituting component, the chain extender having an unsaturated carbon-carbon bond is used, a crosslinking reaction does not substantially proceed during the extrusion of the cover materials, because of less thermal history. Thus, the cover materials can be extruded similarly as in the case of using a conventional thermoplastic polyurethane, without lowering the processability of the cover. On the other hand, a crosslinking reaction proceeds by thermal history applied to the cover composition during molding of the cover. Thus, a crosslinked structure is formed in a finally obtained cover. As a result, a golf ball having excellent abrasion resistance and spin performance is obtained.

According to the present invention, it is possible to provide a golf ball that has excellent abrasion resistance and spin performance without sacrificing the processability of the cover, in a golf ball having a cover for which the crosslinkable thermoplastic polyurethane is used as a resin component.

DESCRIPTION OF THE PREFERRED EMBODIMENT

The present invention is directed to a golf ball comprising: a core; and a cover covering the core, wherein the cover is formed from a cover composition containing a thermoplastic polyurethane that has, as a constituting component, a chain extender having an unsaturated carbon-carbon bond.

First, "the thermoplastic polyurethane having, as a constituting component, a chain extender having an unsaturated carbon-carbon bond" will be explained. The thermoplastic polyurethane is not limited, as long as it has, as a constituting component, a chain extender having an unsaturated carbon-carbon bond (hereinafter, sometimes may be referred to as "unsaturated chain extender component") and a plurality of urethane bonds in a molecule thereof. For example, the thermoplastic polyurethane is obtained by a reaction of the polyisocyanate component, the high-molecular weight polyol component, and the unsaturated chain extender component. The thermoplastic polyurethane shows thermoplasticity before a heat treatment after the production thereof, and generates a crosslinking bond between the unsaturated carbon-carbon bonds if subjected to a heat treatment.

The chain extender having an unsaturated carbon-carbon bond has a polymerizable unsaturated carbon-carbon bond in a molecule thereof, and has at least two active hydrogen groups which are reactive to the isocyanate group, preferably two active hydrogen groups which are reactive to the isocyanate group. Use of the chain extender component having the two active hydrogen groups which are reactive to the isocyanate group provides a linear thermoplastic polyurethane.

The polymerizable unsaturated carbon-carbon bond may be either a double bond or a triple bond. A number of the unsaturated carbon-carbon bond in one molecule is preferably 1 or more. Examples of the active hydrogen group reactive to the isocyanate group include an amino group and a hydroxyl group.

The unsaturated chain extender preferably has a molecular weight of 400 or less, more preferably 350 or less, even more preferably 300 or less. Use of the unsaturated chain extender having a molecular weight of 400 or less increase the concentration of urethane bonds and thus enhances a cohesion of the hard segment. As a result, the crosslinking reaction tends to occur readily between the molecular chains. The unsaturated chain extender has no limitation on the lower limit of the molecular weight, but preferably has a molecular weight of 30 or more, more preferably 40 or more, even more preferably 45 or more.

Examples of the unsaturated chain extender include an alkene diol such as ethene diol, propene diol, butene diol, pentene diol, hexene diol, heptene diol, octene diol, nonene diol, decene diol; an alkyne diol such as ethyne diol, propyne diol, butyne diol, pentyne diol, hexyne diol, heptyne diol, octyne diol, nonyne diol, decyne diol; and (meth)acrylate derivatives such as trimethylol propane mono(meth)acrylate, glycerol monomethacrylate, a reaction product of diethanolamine or dipropanolamine with glycidyl methacrylate, a reaction product of dimethylol propionic acid or dimethylol butanoic acid with glycidyl methacrylate. The unsaturated chain extender preferably includes a diol having 2 to 10 carbon atoms, more preferably an alkene diol or alkyne diol having 2 to 10 carbon atoms, even more preferably an alkene diol having 2 to 10 carbon atoms. The unsaturated chain extender may be used alone or in a combination of at least two of them.

The thermoplastic polyurethane used in the present invention may further contain other chain extenders as a constituting component in addition to the unsaturated chain extender, as long as the effect of the present invention is not impaired. Other chain extenders include a low-molecular weight polyol or a low-molecular weight polyamine. Examples of the low-molecular weight polyol may include a diol such as ethylene glycol, diethylene glycol, triethylene glycol, propanediol (e.g., 1,2-propanediol, 1,3-propanediol, and 2-methyl-1,3-propanediol), dipropylene glycol, butanediol (e.g., 1,2-butanediol, 1,3-butanediol, 1,4-butanediol, 2,3-butanediol, and 2,3-dimethyl-2,3-butanediol), neopentyl glycol, pentanediol, hexanediol, heptanediol, octanediol, 4,4-cyclohexanediol, an aniline based diol, and a bisphenol A based diol; a triol such as glycerin, trimethylol propane, and hexanetriol; a tetraol or a hexanol such as pentaerythritol and sorbitol.

The low-molecular weight polyamine that can be used as a chain extender may include any polyamine, as long as it has at least two amino groups. The polyamine includes an aliphatic polyamine such as ethylenediamine, propylenediamine, butylenediamine, and hexamethylenediamine, an alicyclic polyamine such as isophoronediamine, piperazine, and an aromatic polyamine.

The aromatic polyamine has no limitation, as long as it has at least two amino groups directly or indirectly bonded to an aromatic ring. Herein, the "indirectly bonded to the aromatic ring", for example, means that the amino group is bonded to the aromatic ring via a lower alkylene bond. Further, the aromatic polyamine includes, for example, a monocyclic aromatic polyamine having at least two amino groups bonded to one aromatic ring or a polycyclic aromatic polyamine having at least two aminophenyl groups each having at least one amino group bonded to one aromatic ring.

Examples of the monocyclic aromatic polyamine include a type such as phenylenediamine, tolylenediamine, diethyl-toluenediamine, and dimethylthiotoluenediamine wherein amino groups are directly bonded to an aromatic ring; and a type such as xylylenediamine wherein amino groups are bonded to an aromatic ring via a lower alkylene group. Further, the polycyclic aromatic polyamine may include a poly (aminobenzene) having at least two aminophenyl groups directly bonded to each other or a compound having at least two aminophenyl groups bonded via a lower alkylene group or an alkylene oxide group. Among them, a diaminodiphenylalkane having two aminophenyl groups bonded to each other via a lower alkylene group is preferable. Typically preferred are 4,4'-diaminodiphenylmethane or the derivatives thereof.

The polyisocyanate component constituting the thermoplastic polyurethane used in the present invention is not limited, as long as it has at least two isocyanate groups. Examples of the polyisocyanate include an aromatic polyisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylenediisocyanate (TMXDI), para-phenylene diisocyanate (PPDI); an alicyclic polyisocyanate or aliphatic polyisocyanate such as 4,4'-dicyclohexylmethane diisocyanate ($H_{12}$MDI), hydrogenated xylylenediisocyanate ($H_6$XDI), hexamethylene diisocyanate (HDI), isophorone diisocyanate (IPDI), and norbornene diisocyanate (NBDI). These may be used either alone or as a mixture of at least two of them.

In view of improving the abrasion-resistance, the aromatic polyisocyanate is preferably used as the polyisocyanate component of the thermoplastic polyurethane. Use of the aromatic polyisocyanate improves the mechanical property of the obtained thermoplastic polyurethane and provides the cover with the excellent abrasion-resistance. In addition, in view of improving the weather resistance, as the polyisocyanate component of the thermoplastic polyurethane, a non-yellowing type polyisocyanate such as TMXDI, XDI, HDI, $H_6$XDI, IPDI, $H_{12}$MDI and NBDI is preferably used. More preferably, 4,4'-dicyclohexylmethane diisocyanate ($H_{12}$MDI) is used. Since 4,4'-dicyclohexylmethane diisocyanate ($H_{12}$MDI) has a rigid structure, the mechanical property of the resulting thermoplastic polyurethane is improved, and thus the cover which is excellent in abrasion-resistance can be obtained.

The high-molecular weight polyol component constituting the thermoplastic polyurethane is not limited, as long as it has a plurality of hydroxyl groups. Such examples of the high-molecular weight polyol include a polyether polyol such as polyoxyethylene glycol (PEG), polyoxypropylene glycol (PPG), and polyoxytetramethylene glycol (PTMG); a condensed polyester polyol such as polyethylene adipate (PEA), polybutylene adipate (PBA), and polyhexamethylene adipate (PHMA); a lactone polyester polyol such as poly-ε-caprolactone (PCL); a polycarbonate polyol such as polyhexamethylene carbonate; and an acrylic polyol. The above polyols may be used alone or as a mixture of at least two of them. Among them, as a high-molecular weight polyol, a high molecular weight diol is preferably used.

A number average molecular weight of the high-molecular weight polyol is not particularly limited, and for example, it is preferably more than 400, more preferably 800 or more, even more preferably 1,000 or more. If the number average molecular weight of the high-molecular weight polyol is too small, the resultant polyurethane becomes too hard and the shot feeling of the golf ball is lowered. The upper limit of the number average molecular weight of the high-molecular weight polyol is not particularly limited, and it is preferably 10,000, more preferably 8,000. The number average molecular weight of the polyol component can be measured by Gel permeation Chromatography using two columns of TSK-GEL SUPREH 2500 (TOSOH Corporation) as a column, polystyrene as a standard material, and tetrahydrofuran as an eluate.

The high-molecular weight polyol preferably has a hydroxyl value of 500 mgKOH/g or less, more preferably 250 mgKOH/g or less, even more preferably 100 mgKOH/g or less. The hydroxyl value of the high-molecular weight polyol can be measured for example, by an acetylation method according to JIS K1557-1.

The thermoplastic polyurethane has no limitation on the constitutional embodiments thereof. Examples of the constitutional embodiments are the embodiment where the thermoplastic polyurethane consists of the polyisocyanate component, the high-molecular weight polyol component and the unsaturated chain extender component; and the embodiment where the thermoplastic polyurethane consists of the polyisocyanate component, the high-molecular weight polyol component, the unsaturated chain extender component and another chain extender component.

The thermoplastic polyurethane can be synthesized by a method known to the public.

The thermoplastic polyurethane preferably has a slab hardness of 15 or more, more preferably 20 or more, and preferably has a slab hardness of 50 or less, more preferably 45 or less, even more preferably 42 or less in Shore D hardness. If the slab hardness of the thermoplastic polyurethane is too low, the spin rate may increase on the driver shot, while if the slab hardness of the thermoplastic polyurethane is too high, the spin rate may decrease on the approach shot. The slab hardness of the thermoplastic polyurethane can be measured by the method described later.

The hard segment component (the polyisocyanate component and the chain extender component) of the thermoplastic polyurethane used in the present invention preferably has a concentration of the unsaturated carbon-carbon bond of 0.2 mole/kg or more, more preferably 0.5 mole/kg or more, even more preferably 0.7 mole/kg or more, before being crosslinked. If the concentration of the unsaturated carbon-carbon bond per unit mass is less than 0.2 mole/kg, the crosslinking density is too low and thus the abrasion-resistance of the cover may not be improved. On the other hand, the concentration of the unsaturated carbon-carbon bond in the hard segment component is preferably 3.0 mole/kg or less, more preferably 2.4 mole/kg or less, even more preferably 1.9 mole/kg or less, even more preferably 1.7 mole/kg or less. If the concentration of the unsaturated carbon-carbon bond is more than 3.0 mole/kg, the crosslinking density is too high and thus the obtained cover may become brittle.

The concentration X of the unsaturated carbon-carbon bond per unit mass in the hard segment component of the thermoplastic polyurethane is determined by the following equation (1).

$$X = \frac{1000 \times m \times \left(\frac{W1}{Mn1}\right)}{W2 \div W3} \quad (1)$$

Wherein m is a number of unsaturated carbon-carbon bonds per 1 mole of the unsaturated chain extender, W1 is a mass (g) of the unsaturated chain extender constituting the thermoplastic polyurethane, Mn1 is a molecular weight of the unsaturated chain extender, W2 is a mass (g) of the whole chain extender components constituting the thermoplastic polyurethane, and W3 is a mass (g) of the polyisocyanate component constituting the thermoplastic polyurethane.

The cover composition used in the present invention may contain other resin components in addition to the crosslinkable thermoplastic polyurethane as a resin component, as long as it does not impair the effect of the present invention. Examples of the other resin component include an ionomer resin, a thermoplastic elastomer, a diene block copolymer, or the like.

Examples of the ionomer resin include one prepared by neutralizing at least a part of carboxyl groups in a copolymer, composed of ethylene and α,β-unsaturated carboxylic acid having a carbon number of 3 to 8 with a metal ion; one prepared by neutralizing at least a part of carboxyl groups in a terpolymer composed of ethylene, α,β-unsaturated carboxylic acid having a carbon number of 3 to 8, and α,β-unsaturated carboxylic acid ester with a metal ion; or a mixture of these two. Examples of the α,β-unsaturated carboxylic acid include acrylic acid, methacrylic acid, fumaric acid, maleic acid, crotonic acid, or the like. In particular, acrylic acid and methacrylic acid are preferable. Examples of the α,β-unsaturated carboxylic acid ester include methyl ester, ethyl ester, propyl ester, n-butyl ester, isobutyl ester of acrylic acid, methacrylic acid, fumaric acid, and maleic acid. In particular, acrylic acid ester and methacrylic acid ester are preferable. Examples of the metal ion for neutralizing at least a part of the carboxyl groups are; monovalent metal ions such as sodium, potassium, and lithium; divalent metal ions such as magnesium, calcium, zinc, barium, and cadmium; trivalent metal ions such as aluminum, or other metal ions such as tin and zirconium. In particular, sodium ion, zinc ion, and magnesium ion are preferably used in view of the resilience and durability of the golf ball.

Specific examples of the ionomer resin include "Himilan (registered trade mark)" available from MITSUI-DUPONT POLYCHEMICAL CO., LTD, "Surlyn (registered trade mark)" available from DUPONT CO, and "Iotek (registered trade mark)" available from Exxon Co.

Specific examples of the thermoplastic elastomer includes a thermoplastic polyamide elastomer having a commercial name of "PEBAX", for example, "PEBAX 2533", available from ARKEMA Inc; a thermoplastic polyester elastomer having a commercial name of "HYTREL", for example, "HYTREL 3548" and "HYTREL 4047" available from DU PONT-TORAY Co.; and a thermoplastic polystyrene elastomer having a commercial name of "Rabalon" available from Mitsubishi Chemical Co. Among them, the thermoplastic polystyrene elastomer is preferable. The thermoplastic polystyrene elastomer includes, for example, a polystyrene-diene block copolymer comprising a polystyrene block component as a hard segment and a diene block component, for example polybutadiene, isoprene, hydrogenated polybutadiene, hydrogenated polyisoprene, as a soft segment. The polystyrene-diene block copolymer comprises a double bond derived from a conjugated diene compound of block copolymer or partially hydrogenated block copolymer. Examples of the polystyrene-diene block copolymer are a block copolymer having a SBS (styrene-butadiene-styrene) comprising polybutadiene block; and a block copolymer having a SIS (styrene-isoprene-styrene) structure.

In the case that another resin component is used as the resin component for the cover of the present invention in addition the crosslinkable thermoplastic polyurethane, the resin component preferably contains the crosslinkable thermoplastic polyurethane as the main component. The resin component preferably contains the crosslinkable thermoplastic polyurethane in an amount of 50 mass % or higher, more preferably 60 mass % or higher, and even more preferably 70 mass % or higher. Further, it is also preferable that the resin component essentially consists of the crosslinkable thermoplastic polyurethane.

The cover composition used in the present invention may further include a crosslinking agent, if necessary. Preferred is the crosslinking agent that reacts with the unsaturated carbon-carbon bond of the unsaturated chain extender component to form the crosslinked structure. Examples thereof may include a radical polymerization initiator, an organic sulfur compound, or the like. The crosslinked structure may include an embodiment where the crosslinked structure is formed by reacting the crosslinking agent with the unsaturated carbon-carbon bond parts of the unsaturated chain extender component to bond the unsaturated carbon-carbon bond parts directly; an embodiment where the crosslinked structure is formed by reacting the unsaturated carbon-carbon bond parts of the unsaturated chain extender components with the crosslinking agent such as an organic sulfur compound to crosslink the unsaturated carbon-carbon bond parts via the crosslinking agent; an embodiment where the crosslinked structure is formed by reacting the unsaturated carbon-carbon bond parts of the unsaturated chain extender components with the crosslinking agent and the co-crosslinking agent to crosslink the unsaturated carbon-carbon bond parts via a graft chain consisting of the co-crosslinking agent.

The above-mentioned crosslinking agent is preferably a radical polymerization initiator capable of forming the crosslinked structure by reacting with the polymerizable unsaturated carbon-carbon bond part of the chain extender component constituting the thermoplastic polyurethane. Examples of the above-mentioned radical polymerization initiator may include an organic peroxide, an azo compound, and the like.

Examples of the organic peroxides may include dicumyl peroxide, benzoyl peroxide, di-tert-butyl peroxide, cumene hydroperoxide, succinic peroxide, di(2-ethoxyethyl)peroxydicarbonthe, (α,α'-bis-neodecanoylperoxy)diisopropylbenzene, cumyl peroxyneodecanoate, 1,1,3,3-tetramethylbutyl peroxyneodecanoate, 1-cyclohexyl-1-methylethyl peroxyneodecanoate, tert-hexyl peroxyneodecanoate, tert-butyl peroxyneodecanoate, tert-hexyl peroxypivalate, tert-butyl peroxyneohexanoate, tert-amyl peroxy-2-ethylhexanoate, tert-butyl peroxypivalate, tert-amyl peroxypivalate, 1,1,3,3-tetramethylbutyl peroxy-2-ethylhexanoate, 2,5-dimethyl-2,5-bis(2-ethylhexanoylperoxy)hexane, 1-cyclohexyl-1-methylethyl peroxy-2-ethylhexanoate, tert-hexyl peroxy-2-ethylhexanoate, tert-butyl peroxy-2-ethylhexanoate, tert-butyl peroxyisobutylate, tert-hexyl peroxyisopropyl monocarbonate, tert-butyl peroxy-3,5,5-tri-methylhexanoate, tert-butyl peroxylaurate, 2,5-dimethyl-2,5-bis(m-toluoylperoxy)hexane, tert-butyl peroxyisopropylmonocarbonate, tert-butyl peroxy-2-ethylhexyl monocarbonate, tert-hexyl peroxybenzoate, 2,5-dimethyl-2,5-bis(benzoylperoxy)hexane, tert-butyl peroxyacetate, tert-butyl peroxy-m-toluoylbenzoate, tert-butyl peroxybenzoate, bis-tert-butyl peroxyisophthalate, 2,4,4-trimethylpentyl peroxyphenoxyacetate, di-tert-butyl peroxyhexahydroterephthalate, di-tert-butylperoxyazelate, di-tert-butyl peroxytrimethyladipate, and the like. These organic peroxides may be used alone or in combination of two or more kinds thereof. Among them, dicumyl peroxide, tert-butyl peroxyneodecanoate, tert-hexyl peroxyneodecanoate, tert-butyl peroxypivalate, tert-amyl peroxypivalate, tert-hexyl peroxypivalate, tert-butyl peroxy-2-ethylhexanoate, tert-butyl peroxyisobutylate, and the like.

Specific examples of the above-mentioned organic peroxide may be Percumyl D (10-hour half-life temperature: 116.4° C.), Perbutyl D (10-hour half-life temperature: 123.7° C.), Percumyl H (10-hour half-life temperature: 157.9° C.), Perocta O (10-hour half-life temperature: 65.3° C.), Perhexa 250 (10-hour half-life temperature: 66.2° C.), Perhexyl O (10-hour half-life temperature: 69.9° C.), Perbutyl O (10-hour half-life temperature: 72.1° C.), Perhexyl I (10-hour half-life temperature: 95.0° C.), Perbutyl 355 (10-hour half-life temperature: 97.1° C.), Perbutyl L (10-hour half-life temperature: 98.3° C.), Perbutyl I (10-hour half-life temperature: 98.7° C.) and Perbutyl E (10-hour half-life temperature: 99.0° C.), manufactured by NOF Corporation. The 10-hour half-life temperatures thereof are all the values in benzene (peroxide concentration: 0.10 mol/L).

The above-mentioned azo compound may include dimethyl 2,2'-azobis(2-methylpropionate), 2,2'-azobis(2-methylbutyronitrile), 1,1'-azobis(cyclohexane-1-carbonitrile) azobisisobutyronitrile, azobiscyanovaleric acid or its salts, 2,2'-azobis(2-aminodipropane) hydrochloride, 2,2'-azobis(2-methyl-N-(2-)hydroxyethyl propionamide), and the like. These azo compounds may be used alone or in combination of two or more kinds thereof. Among them, dimethyl-2,2'-azobis(2-methylpropionate), azobisisobutyronitrile, or the like, are preferable.

Specific examples of the above-mentioned azo compounds include V-601 (10-hour half-life temperature: 66° C.), V-59 (10-hour half-life temperature: 67° C.), and V-40 (10-hour half-life temperature: 88° C.), manufactured by Wako Pure Chemical Industries Ltd. The 10-hour half-life temperatures thereof are all the values in toluene.

In the case that a radical polymerization initiator is used as the above-mentioned crosslinking agent, the 10-hour half-life temperature is preferably 60° C. or more, more preferably 70° C. or more, and even more preferably 80° C. or more to improve the efficiency of the crosslinking. On the other hand, the 10-hour half-life temperature of the radical polymerization initiator is preferably 150° C. or less, more preferably 140° C. or less, and even more preferably 130° C. or less. If the 10-hour half-life temperature of the radical polymerization initiator exceeds 150° C., the crosslinking does not so much proceed and the abrasion resistance may possibly be deteriorated and therefore it is not preferable. The 10-hour half-life temperature is a temperature at which the initial concentration of the above-mentioned organic peroxide or azo compound is decreased to a half in 10 hours and can be measured by an experiment in a diluted solution of benzene or the like.

As the organic sulfur compound used as the crosslinking agent, a diphenyl disulfide or a derivative thereof may be preferably used. Examples of the diphenyl disulfide or the derivative thereof include diphenyl disulfide; a mono-substituted diphenyl disulfide such as bis(4-chlorophenyl)disulfide, bis(3-chlorophenyl)disulfide, bis(4-bromophenyl)disulfide, bis(3-bromophenyl)disulfide, bis(4-fluorphenyl)disulfide, bis(4-iodophenyl)disulfide and bis(4-cyanophenyl)disulfide; a di-substituted diphenyl disulfide such as bis(2,5-dichlorophenyl)disulfide, bis(3,5-dichlorophenyl)disulfide, bis(2,6-dichlorophenyl)disulfide, bis(2,5-dibromophenyl)disulfide, bis(3,5-dibromophenyl)disulfide, bis(2-chloro-5-bromophenyl)disulfide, and bis(2-cyano-5-bromophenyl)disulfide; tri-substituted diphenyl disulfide such as bis(2,4,6-trichlorophenyl)disulfide, and bis(2-cyano-4-chloro-6-bromophenyl)disulfide; a tetra-substituted diphenyl disulfide such as bis(2,3,5,6-tetra chlorophenyl)disulfide; a penta-substituted diphenyl disulfide such as bis(2,3,4,5,6-pentachlorophenyl)disulfide and bis(2,3,4,5,6-penta bromophenyl)disulfide. Among them, diphenyl disulfide and bis(penta bromophenyl)disulfide are preferably used since the high resilience cover can be obtained.

The amount of the crosslinking agent to be contained in the cover composition is preferably 0.05 part by mass or more, more preferably 0.1 part by mass or more, even more preferably 0.2 part by mass or more, and is preferably 5.0 parts by mass or less, more preferably 4.0 parts by mass or less, even more preferably 3.0 parts by mass or less based on 100 parts by mass of the thermoplastic polyurethane. If the blending amount of the crosslinking agent is less than 0.05 part by mass, it may be impossible to crosslink the unsaturated carbon-carbon bond parts in the unsaturated chain extender component sufficiently, while the blending amount of more than 5 parts by mass adversely affects the cover properties and also causes the economically inefficiency.

The cover composition of the present invention may further contain a co-crosslinking agent in addition to the crosslinking agent. The co-crosslinking agent is not particularly limited as long as it has the effect of crosslinking unsaturated carbon-carbon bond parts by graft polymerization to the polyurethane molecular chain. Examples of the co-crosslinking agent are α,β-unsaturated carboxylic acid having 3 to 8 carbon atoms or a metal salt thereof, more preferably, acrylic acid, methacrylic acid or a metal salt thereof. As the metal constituting the metal salt, for example, zinc, magnesium, calcium, aluminum and sodium may be used. In the case that the co-crosslinking agent is used, the amount of the co-crosslinking agent to be used is preferably 50 parts or less, more preferably 40 parts or less based on 100 parts of the thermoplastic polyurethane by mass. If the amount of the co-crosslinking agent to be used is more than 50 parts by mass, the cover becomes too hard, so that the abrasion-resistance may be lowered.

The cover composition of the present invention may further contain a pigment such as a white pigment (preferably titanium oxide) and a blue pigment, a gravity adjusting agent such as calcium carbonate and barium sulfate, a dispersant, an antioxidant, an ultraviolet absorber, a light stabilizer, a fluorescent brightener or the like, to the extent that the performance of the cover is not undermined.

The content of the white pigment (preferably titanium oxide) in the cover composition is preferably 0.5 part by mass or more, more preferably 1 part by mass or more, and 10 parts by mass or less, more preferably 8 parts by mass or less, based on 100 parts by mass of the resin component constituting the cover. If the content of the white pigment is 0.5 part by mass or more, it is possible to impart the opacity to the cover. On the other hand, if the content is more than 10 parts by mass, the durability of the cover may be lowered.

The cover composition to be used in the present invention can be obtained by dry blending the thermoplastic polyurethane having the unsaturated chain extender as a constituent and other cover materials such as a pigment, followed by extruding them in the form of pellet. The dry blending may be carried out using for example, a mixer capable of blending a raw material in the form of pellet, more preferably a tumbler type mixer. Extruding can be carried out by publicly known extruders such as a single-screw kneading extruder, a twin-screw kneading extruder, and a twin-single kneading extruder. The extruding condition is not particularly limited, for example, the extrusion is preferably carried out under the condition of suppressing the crosslinking reaction of the thermoplastic polyurethane containing the unsaturated chain extender as a constituent. In the case of extruding the cover materials into the pellet form with a twin-screw kneading extruder, the preferable conditions are for example screw diameter=45 mm; screw revolutions=50 rpm to 400 rpm; screw L/D=35 or less, and die temperature; 140° C. to 250° C.

The cover of the golf ball of the present invention is molded from the above mentioned cover composition. An embodiment for molding a cover is not particularly limited, and includes an embodiment which comprises injection molding the cover composition directly onto the core, or an embodiment which comprises molding the cover composition into a hollow-shell, covering the core with a plurality of the hollow-shells and subjecting the core with a plurality of the hollow shells to the compression-molding (preferably an embodiment which comprises molding the cover composition into a half hollow-shell, covering the core with the two half hollow-shells, and subjecting the core with the two half hollow-shells to the compression-molding).

In the case of forming the cover in a compression molding method, molding of the half shell can be performed by either compression molding method or injection molding method, and the compression molding method is preferred. The compression-molding of the cover composition into half shell can be carried out, for example, under a pressure of 1 MPa or more and 20 MPa or less at a temperature of −20° C. or more and 70° C. or less relative to the flow beginning temperature of the cover composition. From the aspect of promoting the crosslinking reaction during the molding of the half shell, the molding temperature is preferably 100° C. or more, more preferably 120° C. or more, and is preferably 200° C. or less, more preferably 190° C. or less. By performing the molding under the above conditions, a half shell having a uniform thickness can be formed. Examples of a method for molding the cover using half shells include compression molding by covering the core with two half shells. The compression molding of half shells into the cover can be carried out, for example, under a pressure of 0.5 MPa or more and 25 MPa or less at a temperature of −20° C. or more and 70° C. or less relative to the flow beginning temperature of the cover composition. The molding temperature is preferably 100° C. or more, more preferably 120° C. or more, and is preferably 200° C. or less, more preferably 190° C. or less. By performing the molding under the above conditions, a cover for a golf ball having a uniform thickness can be formed.

In the case of directly injection molding the cover composition onto the core, it is preferred to use upper and lower molds for forming a cover having a spherical cavity and pimples, wherein a part of the pimple also serves as a retractable hold pin. When forming the cover by injection molding, the hold pin is protruded to hold the core, and the cover composition which has been heated and melted is charged and then cooled to obtain a cover. For example, the cover composition heated at the temperature ranging from 200° C. to 250° C. is charged into a mold held under the pressure of 9 MPa to 15 MPa for 0.5 to 5 seconds. After cooling for 10 to 60 seconds, the mold is opened and the golf ball with the cover molded is taken out from the mold.

After molding the cover, the golf ball body is preferably subjected to surface treatment such as deburring, cleaning, and sandblast. If desired, a paint film or a mark may be formed.

The thickness of the cover of the golf ball of the present invention is not particularly limited; however, it is preferably 0.3 mm or more, more preferably 0.5 mm or more, and even more preferably 0.7 mm or more. If the thickness of the cover is too thin, the abrasion-resistance may be lowered. Also, the thickness of the cover is preferably 2.5 mm or less, more preferably 2.3 mm or less, and even more preferably 2.1 mm or less. If the thickness of the cover is too thick, the repulsion property may be lowered.

The cover composition for the golf ball of the present invention preferably has the slab hardness of 20 or more, more preferably 22 or more, and even more preferably 24 or more in Shore D hardness. If the cover is too soft, the golf ball gives the shorter flight distance because the spin rate becomes excessively high. The cover composition preferably has the slab hardness of 50 or less, more preferably 48 or less, even more preferably 46 or less, even more preferably less than 40 in Shore D hardness. If the cover is too hard, the controllability may be lowered, because of the lower spin rate. Herein, the slab hardness of the cover means a hardness which is measured by molding the cover composition into a sheet form, as described later.

Next, a preferred embodiment of the core of the golf ball of the present invention will be explained. The core of the golf ball of the present invention includes a single-layered core, a core consisting of a center and a single-layered intermediate layer covering the core, a core consisting of a center and multi-piece or multi-layer of intermediate layers covering the center. The core preferably has a spherical shape. If the core does not have a spherical shape, the cover does not have a uniform thickness. As a result, there exist some portions where the performance of the cover is lowered. On the other hand, the center generally has the spherical shape, but the center may be provided with a rib on the surface thereof so that the surface of the spherical center is divided by the ribs, preferably the surface of the spherical center is evenly divided by the ribs. In one embodiment, the ribs are preferably formed on the surface of the spherical center in an integrated manner, and in another embodiment, the ribs are formed as an intermediate layer on the surface of the spherical center.

The ribs are preferably formed along an equatorial line and meridians that evenly divide the surface of the spherical center, if the spherical center is assumed as the earth. For example, if the surface of the spherical center is evenly divided into 8, the ribs are formed along the equatorial line, any meridian as a standard, and meridians at the longitude 90 degrees east, longitude 90 degrees west, and the longitude 180 degrees east(west), assuming that the meridian as the standard is at longitude 0 degree. If the ribs are formed, the depressed portion divided by the ribs are preferably filled with a plurality of intermediate layers or with a single-layered intermediate layer that fills each of the depressed portions to make a core in the spherical shape. The shape of the ribs, without limitation, includes an arc or an almost arc (for example, a part of the arc is removed to obtain a flat surface at the cross or orthogonal portions thereof).

The core or the center of the golf ball of the present invention, is preferably molded into a spherical shape by, for example, heat-pressing a rubber composition (hereinafter, sometimes simply referred to as "core rubber composition") containing a base rubber, a crosslinking initiator, a co-crosslinking agent, and where necessary a filler.

As the base rubber, a natural rubber or a synthetic rubber can be used. Such examples include a polybutadiene rubber, a natural rubber, a polyisoprene rubber, a styrene polybutadiene rubber, and ethylene-propylene-diene terpolymer (EPDM). Among them, typically preferred is the high cis-polybutadiene having cis-1,4 bond in a proportion of 40% or more, more preferably 70% or more, even more preferably 90% or more in view of its superior repulsion property.

The crosslinking initiator is blended to crosslink the base rubber component. As the crosslinking initiator, an organic peroxide is preferably used. Examples of the organic peroxide for use in the present invention are dicumyl peroxide, 1,1-bis(t-butylperoxy)-3,5-trimethylcyclohexane, 2,5-dimethyl-2,5-di(t-butylperoxy)hexane, and di-t-butyl peroxide. Among them, dicumyl peroxide is preferable. An amount of the crosslinking initiator to be blended in the rubber composition is preferably 0.2 part by mass or more, more preferably 0.3 part by mass or more, and is preferably 3 parts by mass or less, more preferably 2 parts by mass or less based on 100 parts by mass of the base rubber. If the amount is less than 0.2 part by mass, the core becomes too soft, and the resilience tends to be lowered, and if the amount is more than 3 parts by mass, the amount of co-crosslinking agent needs to be increased in order to obtain an appropriate hardness, which may cause the insufficient resilience.

The co-crosslinking agent is not particularly limited as long as it has the effect of crosslinking a rubber molecule by graft polymerization to a base rubber molecular chain; for example, α,β-unsaturated carboxylic acid having 3 to 8 carbon atoms or a metal salt thereof, more preferably acrylic acid, methacrylic acid or a metal salt thereof may be used. As the metal constituting the metal salt, for example, zinc, magnesium, calcium, aluminum and sodium may be used, and among them, zinc is preferred because it provides high resilience. The amount of the co-crosslinking agent to be used is preferably 10 parts or more, more preferably 20 parts or more, and is preferably 50 parts or less, more preferably 40 parts or less based on 100 parts of the base rubber by mass. If the amount of the co-crosslinking agent to be used is less than 10 parts by mass, the amount of the organic peroxide must be increased to obtain an appropriate hardness which tends to lower the resilience. On the other hand, if the amount of the co-crosslinking agent to be used is more than 50 parts by mass, the core becomes too hard, so that the shot feeling may be lowered.

The filler contained in the core rubber composition is mainly blended as a gravity adjusting agent in order to adjust the specific gravity of the golf ball obtained as the final product in the range of 1.0 to 1.5, and may be blended as required. Examples of the filler include an inorganic filler such as zinc oxide, barium sulfate, calcium carbonate, magnesium oxide, tungsten powder, and molybdenum powder. The amount of the filler to be blended in the rubber composition is preferably 2 parts or more, more preferably 3 parts or more, and preferably 50 parts or less, more preferably 35 parts or less based on 100 parts of the base rubber by mass. If the amount of the filler to be blended is less than 2 parts by mass, it becomes difficult to adjust the weight, while if it is more than 50 parts by mass, the weight ratio of the rubber component becomes small and the resilience tends to be lowered.

As the core rubber composition, an organic sulfur compound, an antioxidant or a peptizing agent may be blended appropriately in addition to the base rubber, the crosslinking initiator, the co-crosslinking agent and the filler.

As the organic sulfur compound, a diphenyl disulfide or a derivative thereof may be preferably used. Examples of the diphenyl disulfide or the derivative thereof include diphenyl disulfide; a mono-substituted diphenyl disulfide such as bis(4-chlorophenyl)disulfide, bis(3-chlorophenyl)disulfide, bis(4-bromophenyl)disulfide, bis(3-bromophenyl)disulfide, bis(4-fluorophenyl)disulfide, bis(4-iodophenyl)disulfide and bis(4-cyanophenyl)disulfide; a di-substituted diphenyl disulfide such as bis(2,5-dichlorophenyl)disulfide, bis(3,5-dichlorophenyl)disulfide, bis(2,6-dichlorophenyl)disulfide, bis(2,5-dibromophenyl)disulfide, bis(3,5-dibromophenyl)disulfide, bis(2-chloro-5-bromophenyl)disulfide, and bis(2-cyano-5-bromophenyl)disulfide; a tri-substituted diphenyl disulfide such as bis(2,4,6-trichlorophenyl)disulfide, and bis(2-cyano-4-chloro-6-bromophenyl)disulfide; a tetra-substituted diphenyl disulfide such as bis(2,3,5,6-tetra chlorophenyl)disulfide; a penta-substituted diphenyl disulfide such as bis(2,3,4,5,6-pentachlorophenyl)disulfide and bis(2,3,4,5,6-pentabromophenyl)disulfide. These diphenyl disulfides or the derivative thereof can enhance resilience by having some influence on the state of vulcanization of vulcanized rubber. Among them, diphenyl disulfide and bis(pentabromophenyl)disulfide are preferably used since a golf ball having particularly high resilience can be obtained. The amount of the diphenyl disulfide or the derivative thereof to be blended is preferably 0.1 part by mass or more, more preferably 0.3 part by mass or more, and preferably 5.0 parts by mass or less, more preferably 3.0 parts by mass or less relative to 100 parts by mass of the base rubber.

The amount of the antioxidant to be blended is preferably 0.1 part or more and is preferably 1 part or less based on 100 parts of the base rubber by mass. Further, the amount of the peptizing agent is preferably 0.1 part or more and is preferably 5 parts or less based on 100 parts of the base rubber by mass.

The conditions for press-molding the rubber composition should be determined depending on the rubber composition. The press-molding is preferably carried out for 10 to 60 minutes at the temperature of 130 to 200° C. Alternatively, the press-molding is preferably carried out in a two-step heating, for example, for 20 to 40 minutes at the temperature of 130 to 150° C., and continuously for 5 to 15 minutes at the temperature of 160 to 180° C.

The core used in the golf ball of the present invention preferably has a diameter of 39 mm or larger, more preferably 39.5 mm or larger, and even more preferably 40.8 mm or larger, and preferably has a diameter of 42.2 mm or smaller, more preferably 42 mm or smaller, and even more preferably 41.8 mm or smaller. If the diameter of the core is smaller than the above lower limit, the cover becomes so thick that the resulting golf ball would have reduced resilience. On the other hand, if the diameter of the core is larger than the above upper limit, the cover becomes so thin that it is difficult to mold a cover.

In the case that the core has a diameter of from 39 mm to 42.2 mm, the compression deformation amount (deformation amount along the shrinkage direction) of the core when applying a load from 98 N as an initial load to 1275 N as a final load is preferably 2.50 mm or more, more preferably 2.60 mm or more, and is preferably 3.20 mm or less, and more preferably 3.10 mm or less. If the above deformation amount is less than 2.50 mm, the core becomes too hard, resulting in worsening the shot feeling, while if the above deformation amount is larger than 3.20 mm, the repulsion property may be lowered.

In a preferable embodiment, the core has a hardness difference between the center and the surface. The difference between the surface hardness and the center hardness is preferably 10 or more, more preferably 12 or more, and is preferably 40 or less, more preferably 35 or less, and even more preferably 30 or less in JIS-C hardness. If the hardness difference is more than 40, the durability may be lowered, while if the hardness difference is less than 10, the shot feeling may be hard because of a large impact. The surface hardness of the core is preferably 65 or more, more preferably 70 or more, even more preferably 72 or more, and is preferably 100 or less in JIS-C hardness. If the surface hardness of the core is less than 65 in JIS-C hardness, the core is so soft and the repulsion property may be lowered, resulting in shortening the flight distance. On the other hand, if the surface hardness of the core is more than 100, the core is so hard and the shot feeling may be lowered. The center hardness of the core is preferably 45 or more, more preferably 50 or more, and is preferably 70 or less, and more preferably 65 or less in JIS-C hardness. If the center hardness of the core is less than 45, the core is so soft and the durability may be lowered, while if the center hardness of the core is more than 70, the core is so hard and the shot feeling may be worsened. The hardness difference of the core can be formed by properly selecting the heat molding conditions of the core.

In the case that the golf ball of the present invention is a three-piece golf ball or a multi-piece golf ball, examples of the material for the intermediate layer are a thermoplastic polyamide elastomer having a commercial name of "Pebax (registered trademark) (e.g. Pebax 2533)" available from Arkema; a thermoplastic polyester elastomer having a commercial name of "Hytrel (registered trademark) (e.g. Hytrel 3548, Hytrel 4047)" available from Du Pont-Toray Co., Ltd.; a thermoplastic polyurethane elastomer having a commercial name of "Elastollan (registered trademark) (e.g. Elastollan XNY97A)" available from BASF Japan Co., a thermoplastic polystyrene elastomer having a commercial name of "Rabalon (registered trademark) (e.g. Rabalon SR04, Rabalon T3339C, Rabalon T3221C)" available from Mitsubishi Chemical Corporation, in addition to the cured product of the rubber composition or the conventional ionomer resin. The intermediate layer may further contain a gravity adjusting agent such as barium sulfate, tungsten or the like, an antioxidant, and a pigment or the like.

In the case of using the intermediate layer composition containing a rubber composition as a main component (50 mass % or more), the intermediate layer preferably has a thickness of 1.2 mm or more, more preferably 1.8 mm or more, even more preferably 2.4 mm or more, and preferably has a thickness of 6.0 mm or less, more preferably 5.2 mm or less, even more preferably 4.4 mm or less.

In the case of using the intermediate layer composition containing the resin composition as a main component (50 mass % or more), the intermediate layer preferably has a thickness of 0.3 mm or more, more preferably 0.4 mm or more, even more preferably 0.5 mm or more, and preferably has a thickness of 2.5 mm or less, more preferably 2.4 mm or less, even more preferably 2.3 mm or less. If the thickness of the intermediate layer is more than 2.5 mm, the resilience performance of the obtained golf ball may be lowered, while if the thickness of the intermediate layer is less than 0.3 mm, it may be difficult to suppress the spin rate on the driver shot.

The intermediate layer of the golf ball of the present invention preferably has a slab hardness of 50 or larger, more preferably 52 or larger, and even more preferably 54 or larger, and preferably has a slab hardness of 75 or smaller, more preferably 73 or smaller, and even more preferably 71 or smaller in Shore D hardness. The intermediate layer having the slab hardness of 50 or more in shore D hardness makes the core have the higher degree of "hard outer and soft inner" structure, thereby providing a high launch angle and a less amount of spin and hence achieving a greater flight distance of the gold ball. On the other hand, the intermediate layer having the slab hardness of 75 or less in shore D hardness provides an excellent shot feeling as well as improves the spin performance of the golf ball, thereby improving controllability of the golf ball. Herein, the slab hardness of the intermediate layer is the measured hardness of the intermediate layer composition in the form of a sheet, and is measured by a later-described measuring method. The slab hardness of the intermediate layer can be adjusted, for example, by appropriately selecting a combination of the above resin component and the rubber material and the amount of additives.

An embodiment for molding the intermediate layer is not particularly limited, and includes an embodiment which comprises injection molding the intermediate layer composition directly onto the center, or an embodiment which comprises molding the intermediate layer composition into a half hollow-shell, covering the center with the two hollow-shells and subjecting the center with the two hollow shells to the compression-molding at the temperature of 130° C. to 170° C. for 1 to 5 minutes.

When preparing a wound golf ball in the present invention, a wound core may be used as the core. In that case, for example, a wound core comprising a center formed by curing the above rubber composition for the core and a rubber thread layer which is formed by winding a rubber thread around the center in an elongated state can be used. In the present invention, the rubber thread, which is conventionally used for winding around the center, can be adopted for winding around the center. The rubber thread, for example, is obtained by vulcanizing a rubber composition including a natural rubber, or a mixture of a natural rubber and a synthetic polyisoprene, a sulfur, a vulcanization auxiliary agent, a vulcanization accelerator, and an antioxidant. The rubber thread is wound around the center in elongation of about 10 times length to form the wound core.

The golf ball of the present invention is not particularly limited on a structure thereof as long as the golf ball includes a core and a cover. Examples of the golf ball of the present invention include a two-piece golf ball including a core, and a cover covering the core; a three-piece golf ball including a core consisting of a center and an intermediate layer covering the center, and a cover covering the core; a multi-piece golf ball including a core consisting of a center and a multi-piece or multi-layer of intermediate layers covering the center, and a cover covering the core; and a wound golf ball including a wound core, and a cover covering the wound core.

EXAMPLES

The following examples illustrate the present invention, however these examples are intended to illustrate the invention and are not to be construed to limit the scope of the present invention. Many variations and modifications of such examples will exist without departing from the scope of the inventions. Such variations and modifications are intended to be within the scope of the invention.

[Evaluation Methods]

(1) Abrasion-Resistance

A commercially available sand wedge (available from SRI sports limited, S shaft) was installed on a swing robot available from Golf Laboratories, Inc., and two points of a ball were both hit once at a head speed of 36 m/sec to observe the portions which were hit. Each hit portion was evaluated and ranked into eight levels based on the following criteria, and an average rank score for the two points was calculated. A smaller score indicates higher abrasion-resistance.

0 point: No hitting marks were observed.

1 point: Dot-like peeling (a maximum size is smaller than 3 mm) was observed.

2 point: Dot-like peeling (a maximum size is 3 mm or larger) was observed.

3 point: Line-like peeling (a maximum size is 5 mm or larger) was observed.

4 point: Clear line-like peeling (a maximum size is 5 mm or larger) was observed.

5 point: Deep and wide line-like peeling (a maximum size is 5 mm or larger) was observed.

6 point: Deep and wide peeling which was almost a plane was observed.

7 point: A part of the cover was scraped away as a plane.

(2) Spin Rate

An approach wedge (SRIXON I-302 available from SRI Sports Limited) was installed on a swing robot available from Golf Laboratories, Inc. A golf ball was hit at a head speed of 21 m/sec., and a sequence of photographs of the hit golf ball were taken for measuring the spin rate (rpm). The measurement was performed ten times for each golf ball, and the average value is regarded as the spin rate (rpm).

(3) Slab Hardness (Shore D Hardness)

Sheets having a thickness of about 2 mm were prepared from the cover composition or the intermediate layer composition by hot press molding and preserved at the temperature of 23° C. for two weeks. The hot press molding was conducted under at the temperature of 170° C. for 5 minutes. Three or more of the sheets were stacked on one another to avoid being affected by the measuring substrate on which the sheets were placed, and the stack was subjected to the measurement using a P1 type auto hardness tester provided with the Shore D type spring hardness tester prescribed by ASTM-D2240, available from KOUBUNSHI KEIKI CO., LTD to obtain the respective slab hardness of the cover composition or the intermediate layer composition.

(4) Core Hardness (JIS-C)

The hardness measured at a surface part of a spherical core using a JIS-C type spring hardness tester specified by JIS K6301, was determined as the surface hardness of the spherical core, and the JIS-C hardness obtained by cutting a spherical core into halves and measuring at the center of the cut surface was determined as the center hardness of the spherical core.

[Production of the Golf Ball]

(1) Preparation of the Center

The center rubber compositions having formulation shown in Table 1 were kneaded and pressed in upper and lower molds, each having a hemispherical cavity, at a temperature of 170° C. for 15 minutes to obtain the spherical centers.

TABLE 1

| Center composition | A | B |
|---|---|---|
| Polybutadiene rubber | 100 | 100 |
| Zinc acrylate | 35 | 38 |
| Zinc oxide | 5 | 5 |
| Diphenyl disulfide | 0.5 | 0.5 |
| Dicumyl peroxide | 1 | 1 |

Parts by Mass

Polybutadiene rubber: BR730 (high cis-polybutadiene) manufactured by JSR Corporation Zinc acrylate: ZNDA-90S manufactured by NIHON JYORYU KOGYO Co., LTD.

Zinc oxide: Ginrei R manufactured by Toho-Zinc Co.

Dicumyl peroxide: Percumyl D manufactured by NOF Corporation

Diphenyl disulfide: manufactured by Sumitomo Seika Chemicals Company Limited (2) Preparation of Core Core Nos. 1 to No. 4, No. 6 to No. 8

Next, the materials for the intermediate layer shown in Table 2 were mixed by a twin-screw kneading extruder to prepare an intermediate layer composition in the form of pellet. Extrusion was performed in the following conditions: screw diameter=45 mm; screw revolutions=200 rpm; and screw L/D=35. The mixtures were heated to a temperature ranging from 150° C. to 230° C. at a die position of the extruder. The obtained intermediate layer composition was injection molded on the center which had been obtained as described above, to prepare a core consisting of the center and the intermediate layer covering the center.

Core No. 5

The intermediate layer composition was first kneaded and the upper die for molding a center in the state that the center was set therein and a lower die for molding a core were clamped in a manner that a necessary amount of the intermediate layer composition was brought into contact with a half of the surface of the center and heat pressing was carried out to produce an intermediate core molded product having an intermediate layer formed on a half of the surface of the center. Next, the lower die for molding the core in the state that the intermediate layer of the intermediate core molded product was housed and an upper die for molding a core were clamped in a manner that a necessary amount of the intermediate layer composition was brought into contact with the other half of the surface of the center and heat pressing was carried out to produce a core having an intermediate layer on the other half of the surface of the center.

Core No. 9

The center was used as the core.

TABLE 2

| | | Core No. | | | | | | | | |
|---|---|---|---|---|---|---|---|---|---|---|
| | | 1 | 2 | 3 | 4 | 5 | 6 | 7 | 8 | 9 |
| Center | Center composition | A | A | A | A | A | A | A | A | B |
| | Center diameter (mm) | 38.5 | 38.5 | 38.5 | 39.7 | 36.7 | 38.9 | 37.5 | 35.5 | 41.7 |
| Intermediate layer | Intermediate layer composition | a | b | c | d | e | f | g | h | — |
| | Himilan 1605 | 50 | 40 | — | 50 | — | 50 | 50 | 50 | — |
| | Himilan AM7329 | 50 | 35 | — | 50 | — | 50 | 50 | 50 | — |
| | Rabalon T3221C | — | 25 | — | — | — | — | — | — | — |
| | Surlyn 8140 | — | — | 50 | — | — | — | — | — | — |
| | Surlyn 9120 | — | — | 50 | — | — | — | — | — | — |
| | Polybutadiene | — | — | — | — | 100 | — | — | — | — |
| | Zinc acrylate | — | — | — | — | 40 | — | — | — | — |
| | Zinc oxide | — | — | — | — | 5 | — | — | — | — |
| | Diphenyl disulfide | — | — | — | — | 0.5 | — | — | — | — |
| | Dicumyl peroxide | — | — | — | — | 1 | — | — | — | — |
| | Slab hardness (Shore D) | 64 | 50 | 69 | 64 | 60 | 64 | 64 | 64 | — |
| | Thickness (mm) | 1.6 | 1.6 | 1.6 | 1 | 2.5 | 1.6 | 1.6 | 1.6 | — |
| Core Property | Diameter (mm) | 41.7 | 41.7 | 41.7 | 41.7 | 41.7 | 42.1 | 40.7 | 38.7 | 41.7 |
| | Surface hardness (JIS-C) | 98 | 80 | 99 | 98 | 88 | 98 | 98 | 98 | 86 |
| | Center hardness (JIS-C) | 65 | 65 | 65 | 65 | 65 | 65 | 65 | 65 | 67 |
| | Hardness difference (JIS-C) | 33 | 15 | 34 | 33 | 23 | 33 | 33 | 33 | 19 |
| | Compression deformation amount (mm) | 2.55 | 2.75 | 2.45 | 2.7 | 2.35 | 2.55 | 2.55 | 2.5 | 2.6 |

Formulation: parts by mass

Notes on Table 2:
Himilan 1605: sodium ion neutralized ethylene-methacrylic acid copolymerized ionomer resin manufactured by MITSUI-DUPONT POLYCHEMICAL CO., LTD.
Himilan AM7329: zinc ion neutralized ethylene-methacrylic acid copolymerized ionomer resin manufactured by MITSUI-DUPONT POLYCHEMICAL CO., LTD.
Rabalon T3221C: Thermoplastic polystyrene elastomer available from Mitsubishi Chemical Corporation.
SURLYN 8140: a sodium ion neutralized ethylene-methacrylic acid copolymer ionomer resin available from E.I. du Pont de Nemours and Company.
SURLYN 9120: a zinc ion neutralized ethylene-methacrylic acid copolymer ionomer resin available from E.I. du Pont de Nemours and Company.
Polybutadiene rubber: BR730 (high cis-polybutadiene) manufactured by JSR Corporation
Zinc acrylate: ZNDA-90S manufactured by NIHON JYORYU KOGYO Co., LTD.
Zinc oxide: Ginrei R manufactured by Toho-Zinc Co.
Dicumyl peroxide: Percumyl D manufactured by NOF Corporation
Diphenyl disulfide: manufactured by Sumitomo Seika Chemicals Company Limited (3) [Synthesis of the Polyurethane]

To have the compositions as shown in Tables 3 to 5, first, PTMG2000 heated at the temperature of 80° C. was added to $H_{12}$MDI heated at the temperature of 80° C. Then, dibutyl tin dilaurate (dibutyl tin dilaurate available from Aldrich, Inc.) of 0.005 mass % of the total amount of the raw materials ($H_{12}$MDI, PTMG2000, and Chain extender) was added thereto. Then, the mixture was stirred at the temperature of 80° C. for 2 hours under a nitrogen gas flow. Under a nitrogen gas flow, the chain extender heated at the temperature of 80° C. was added to the mixture, and the mixture was stirred at the temperature of 80° C. for 1 minute. Then, the reaction liquid was cooled, and degassed under the reduced pressure for 1 minute at the room temperature. After the degassing, the reaction liquid was spread in a container, kept at the temperature of 110° C. for 6 hours under a nitrogen gas atmosphere to carry out a chain extending reaction, thereby obtaining polyurethanes.

TABLE 3

| | | | Golf ball No. | | | | | | | | |
|---|---|---|---|---|---|---|---|---|---|---|---|
| | | | 1 | 2 | 3 | 4 | 5 | 6 | 7 | 8 | 9 |
| Core | No. | | 1 | 1 | 1 | 1 | 1 | 1 | 1 | 1 | 1 |
| | Intermediate layer hardness | Shore D | 64 | 64 | 64 | 64 | 64 | 64 | 64 | 64 | 64 |
| | Intermediate layer thickness | mm | 1.6 | 1.6 | 1.6 | 1.6 | 1.6 | 1.6 | 1.6 | 1.6 | 1.6 |
| | Core Diameter | mm | 41.7 | 41.7 | 41.7 | 41.7 | 41.7 | 41.7 | 41.7 | 41.7 | 41.7 |
| Cover composition | Polyurethane | Parts by mass | | | | | 100 | | | | |
| | Constituting component | M.W. | | | | | Molar ratio | | | | |
| | PTMG2000 | 2000 | 1 | 1 | 1 | 1 | 1 | 1 | 1 | 1 | 1 |
| | $H_{12}$MDI | 262 | 4 | 4 | 4 | 4 | 4 | 4 | 4 | 4 | 4 |
| | BED | 88 | 0 | 0.6 | 0.9 | 1.2 | 1.5 | 1.8 | 2.1 | 2.4 | 3 |
| | BD | 90 | 3 | 2.4 | 2.1 | 1.8 | 1.5 | 1.2 | 0.9 | 0.6 | 0 |
| | Slab hardness of polyurethane | Shore D | 39 | 38 | 38 | 37 | 37 | 36 | 36 | 35 | 35 |
| | Concentration of unsaturated carbon-carbon bond in hard segment (mole/kg) | | 0.0 | 0.5 | 0.7 | 0.9 | 1.1 | 1.4 | 1.6 | 1.8 | 2.3 |
| | Titanium oxide | Parts by mass | | | | | 4 | | | | |
| | Cover thickness | mm | 0.5 | 0.5 | 0.5 | 0.5 | 0.5 | 0.5 | 0.5 | 0.5 | 0.5 |
| | Slab hardness | Shore D | 40 | 39 | 39 | 38 | 38 | 37 | 37 | 36 | 36 |

TABLE 3-continued

|  |  | Golf ball No. | | | | | | | | |
| --- | --- | --- | --- | --- | --- | --- | --- | --- | --- | --- |
|  |  | 1 | 2 | 3 | 4 | 5 | 6 | 7 | 8 | 9 |
| Evaluation | Extrusion processability | Good | Good | Good | Good | Good | Good | Good | Good | Good |
|  | Abrasion-resistance | 6 | 4.5 | 2 | 1 | 0.5 | 1 | 2 | 4.5 | 5 |
|  | Spin performance (rpm) | 6400 | 6500 | 7000 | 7100 | 7100 | 7100 | 7100 | 7100 | 7100 |

Formulation of polyurethane: molar ratio,
Formulation of cover composition: parts by mass,
M.W.: molecular weight

TABLE 4

|  |  |  | Golf ball No. | | | | | | | | | |
| --- | --- | --- | --- | --- | --- | --- | --- | --- | --- | --- | --- | --- |
|  |  |  | 10 | 11 | 12 | 13 | 14 | 15 | 16 | 17 | 18 | 19 |
| Core | No. |  | 1 | 1 | 6 | 7 | 8 | 9 | 2 | 3 | 4 | 5 |
|  | Intermediate layer hardness | Shore D | 64 | 64 | 64 | 64 | 64 | — | 50 | 69 | 64 | 60 |
|  | Intermediate layer thickness | mm | 1.6 | 1.6 | 1.6 | 1.6 | 1.6 | — | 1.6 | 1.6 | 1 | 2.5 |
|  | Core Diameter | mm | 41.7 | 41.7 | 42.1 | 40.7 | 38.7 | 41.7 | 41.7 | 41.7 | 41.7 | 41.7 |
| Cover composition | Polyurethane | Parts | | | | | 100 | | | | | |
|  | Constituting component | M.W. | | | | | Molar ratio | | | | | |
|  | PTMG2000 | 2000 | 1 | 1 | 1 | 1 | 1 | 1 | 1 | 1 | 1 | 1 |
|  | H$_{12}$MDI | 262 | 2.4 | 6 | 4 | 4 | 4 | 4 | 4 | 4 | 4 | 4 |
|  | BED | 88 | 0.7 | 2.5 | 1.5 | 1.5 | 1.5 | 1.5 | 1.5 | 1.5 | 1.5 | 1.5 |
|  | BD | 90 | 0.7 | 2.5 | 1.5 | 1.5 | 1.5 | 1.5 | 1.5 | 1.5 | 1.5 | 1.5 |
|  | Slab hardness of polyurethane | Shore D | 19 | 49 | 37 | 37 | 37 | 37 | 37 | 37 | 37 | 37 |
|  | Concentration of unsaturated carbon-carbon bond in hard segment (mole/kg) |  | 0.9 | 1.2 | 1.1 | 1.1 | 1.1 | 1.1 | 1.1 | 1.1 | 1.1 | 1.1 |
|  | Titanium oxide | Parts | | | | | 4 | | | | | |
|  | Cover thickness | mm | 0.5 | 0.5 | 0.3 | 1.0 | 2.0 | 0.5 | 0.5 | 0.5 | 0.5 | 0.5 |
|  | Slab hardness | Shore D | 20 | 50 | 38 | 38 | 38 | 38 | 38 | 38 | 38 | 38 |
| Evaluation | Extrusion processability |  | Good | Good | Good | Good | Good | Good | Good | Good | Good | Good |
|  | Abrasion-resistance |  | 0.5 | 0.5 | 1 | 0.5 | 0 | 0.5 | 0 | 1 | 0.5 | 0.5 |
|  | Spin performance (rpm) |  | 8000 | 5500 | 6900 | 7300 | 7400 | 7500 | 7300 | 6900 | 7400 | 7300 |

Formulation of polyurethane: molar ratio,
Formulation of cover composition: parts by mass
M.W.: molecular weight

TABLE 5

|  |  |  | Golf ball No. | | | | | | | | |
| --- | --- | --- | --- | --- | --- | --- | --- | --- | --- | --- | --- |
|  |  |  | 20 | 21 | 22 | 23 | 24 | 25 | 26 | 27 | 28 |
| Core | No. |  | 1 | 1 | 1 | 1 | 1 | 1 | 1 | 1 | 1 |
|  | Intermediate layer hardness | Shore D | 64 | 64 | 64 | 64 | 64 | 64 | 64 | 64 | 64 |
|  | Intermediate layer thickness | mm | 1.6 | 1.6 | 1.6 | 1.6 | 1.6 | 1.6 | 1.6 | 1.6 | 1.6 |
|  | Core Diameter | mm | 41.7 | 41.7 | 41.7 | 41.7 | 41.7 | 41.7 | 41.7 | 41.7 | 41.7 |
| Cover composition | Polyurethane | Parts by mass | | | | | 100 | | | | |
|  | Constituting component | M.W. | | | | | Molar ratio | | | | |
|  | PTMG2000 | 2000 | 1 | 1 | 1 | 1 | 1 | 1 | 1 | 1 | 1 |
|  | H$_{12}$MDI | 262 | 4 | 4 | 4 | 4 | 4 | 4 | 4 | 4 | 4 |
|  | BYD | 86 | 0 | 0.6 | 0.9 | 1.2 | 1.5 | 1.8 | 2.1 | 2.4 | 3 |
|  | BD | 90 | 3 | 2.4 | 2.1 | 1.8 | 1.5 | 1.2 | 0.9 | 0.6 | 0 |
|  | Slab hardness of polyurethane | Shore D | 39 | 38 | 38 | 37 | 37 | 36 | 36 | 35 | 35 |
|  | Concentration of unsaturated carbon-carbon bond in hard segment (mole/kg) |  | 0.0 | 0.5 | 0.7 | 0.9 | 1.1 | 1.4 | 1.6 | 1.8 | 2.3 |
|  | Titanium oxide | Parts by mass | | | | | 4 | | | | |
|  | Cover thickness | mm | 0.5 | 0.5 | 0.5 | 0.5 | 0.5 | 0.5 | 0.5 | 0.5 | 0.5 |
|  | Slab hardness | Shore D | 40 | 39 | 39 | 38 | 38 | 37 | 37 | 36 | 36 |
| Evaluation | Extrusion processability |  | Good | Good | Good | Good | Good | Good | Good | Good | Good |
|  | Abrasion-resistance |  | 6 | 4 | 2 | 1 | 0.5 | 1 | 2 | 5.5 | 6 |
|  | Spin performance (rpm) |  | 6400 | 6600 | 7000 | 7200 | 7200 | 7200 | 7200 | 7200 | 7200 |

Formulation of polyurethane: molar ratio,
Formulation of cover composition: parts by mass,
M.W.: molecular weight Materials Used in Table 3 to 5
H$_{12}$MDI: Desmodur W available from Sumika Bayer Urethane Co., Ltd.
PTMG2000: Polytetramethylene ether glycol, PTMG-2000SN (Number average molecular weight 2000) available from HODOGAYA CHEMICAL Co., Ltd.
BED: 2-butene-1,4-diol, available from ACROS
BYD: 2-butyne-1,4-diol, available from Tokyo Chemical Industry Co., Ltd.
BD: 1,4-butanediol available from WAKO Pure Chemicals, Industries, Ltd.

(4) Formulating of Cover Compositions

The cover materials shown in Tables 3 to 5 were mixed by a twin-screw kneading extruder to prepare cover compositions in the form of pellet. Extrusion was performed in the following conditions: screw diameter=45 mm; screw revolutions=200 rpm; and screw L/D=35. The mixtures were heated to a temperature ranging from 150° C. to 230° C. at a die position of the extruder. All of the cover compositions could be extruded in the form of a strand and therefore the extrusion processability was good. The cover compositions after the extrusion were found to be dissolved in N,N-dimethylformamide, this indicated that the crosslinking reaction did not occur between the molecular chains of the thermoplastic polyurethane.

(5) Molding of Half Shells

Compression molding of half shells were performed by, charging one pellet of the cover composition obtained as described above into each of depressed parts of lower molds for molding half shells, and applying pressure to mold half shells. Compression molding was performed at a temperature of 160° C. for 5 minutes under a molding pressure of 2.94 MPa. The solubility of the half shells into the N,N-dimethylformamide was tested, and it was found that the half shells were not dissolved. This result indicated that the polyurethane constituting the half shell is crosslinked.

(6) Molding of the Cover

The core obtained in (2) was covered with the two half shells obtained in (5) in a concentric manner, and the cover was molded by compression molding. Compression molding was performed at a temperature of 150° C. for 2 minutes under a molding pressure of 9.8 MPa. The surface of the obtained golf ball body was subjected to a sandblast treatment, and marking, and then clear paint was applied thereto and dried in an oven at a temperature of 40° C. to obtain a golf ball having a diameter of 42.7 mm and a weight of 45.3 g. Abrasion-resistance and spin performance of the obtained golf ball were evaluated, and results thereof are shown in Tables 3 to 5.

Golf balls No. 2 to 19 and No. 21 to 28 are the cases where the covers are formed from cover compositions containing the thermoplastic polyurethane having, as a constituting component, a chain extender having an unsaturated carbon-carbon bond. It has been found that all of them are excellent in the abrasion-resistance and spin performance. Especially, in the case that the number (mole/kg) of the unsaturated carbon-carbon bond in the hard segment falls within the range from 0.7 to 1.6, the abrasion-resistance was remarkably improved. The comparison between the golf ball No. 10 and No. 11 indicated that the spin performance was improved by lowering the slab hardness of the cover. The comparison of the golf balls No. 5, and No. 12 to No. 14 indicated that the abrasion-resistance was improved by making the cover thickness thin.

The present invention can be suitably applied to the golf ball having a cover, and especially suitable for the improvement of the cover using the thermoplastic polyurethane as a resin component. This application is based on Japanese Patent application No. 2009-154725 filed on Jun. 30, 2009, the contents of which are hereby incorporated by reference.

What is claimed is:

1. A golf ball comprising:
a core; and a cover covering the core,
wherein the cover is formed from a cover composition containing a thermoplastic polyurethane that has, as a constituting component, a chain extender having an unsaturated carbon-carbon bond,
wherein the chain extender is at least one selected from the group consisting of ethene diol, propene diol, butene diol, pentene diol, hexene diol, heptene diol, octene diol, nonene diol, decene diol, ethyne diol, propyne diol, butyne diol, pentyne diol, hexyne diol, heptyne diol, octyne diol, nonyne diol, and decyne diol,
wherein the thermoplastic polyurethane contains a polyisocyanate component, a high-molecular weight polyol component, and the chain extender component, as the constituting component, and a concentration of the unsaturated carbon-carbon bond in a hard segment component consisting of the polyisocyanate component and the chain extender component falls within a range from 0.2 mole/kg to 1.9 mole/kg, and
wherein the thermoplastic polyurethane has a slab hardness ranging from 15 to 50 in Shore D hardness.

2. The golf ball according to claim 1, wherein the concentration of the unsaturated carbon-carbon bond in the hard segment consisting of the polyisocyanate component and the chain extender component falls within a range from 0.7 mole/kg to 1.7 mole/kg.

3. The golf ball according to claim 1, wherein the thermoplastic polyurethane contains dicyclohexylmethane diisocyanate as the polyisocyanate component.

4. The golf ball according to claim 1, wherein the thermoplastic polyurethane contains polyoxytetramethyleneglycol as the high-molecular weight polyol component.

5. The golf ball according to claim 1, wherein the cover has a hardness ranging from 20 to 50 in Shore D hardness.

6. The golf ball according to claim 1, wherein the cover has a thickness ranging from 0.3 mm to 2.5 mm.

7. The golf ball according to claim 1, wherein the core is a multi-layered core having a center and at least one intermediate layer covering the center.

8. The golf ball according to claim 7, wherein the intermediate layer has a hardness ranging from 50 to 75 in Shore D hardness.

9. The golf ball according to claim 7, wherein the intermediate layer has a thickness ranging from 0.3 mm to 6.0 mm.

10. The golf ball according to claim 1, wherein the core has a hardness difference between a surface hardness and a center hardness ranging from 10 to 40 in JIS-C hardness.

11. The golf ball according to claim 1, wherein the chain extender has a molecular weight ranging from 30 to 400.

12. The golf ball according to claim 1, wherein the chain extender is 2-butene-1,4-diol or 2-butyne-1,4-diol.

13. The golf ball according to claim 1, wherein the high-molecular weight polyol has a number average molecular weight of more than 400 and 10,000 or less.

14. The golf ball according to claim 1, wherein the high-molecular weight polyol has a hydroxyl value of 500 mg KOH/g or less.

* * * * *